LEONARD DEVORE.
Improvement in Combined Corn-Harvester and Husker.

No. 118,217.    Patented Aug. 22, 1871.

Witnesses: H. J. Stretz, Thos. D. Durand

Inventor: Leonard Devore, per [Attorneys]

LEONARD DEVORE.
Improvement in Combined Corn-Harvester and Husker.
No. 118,217.  
2 Sheets--Sheet 2.  
Patented Aug. 22, 1871.
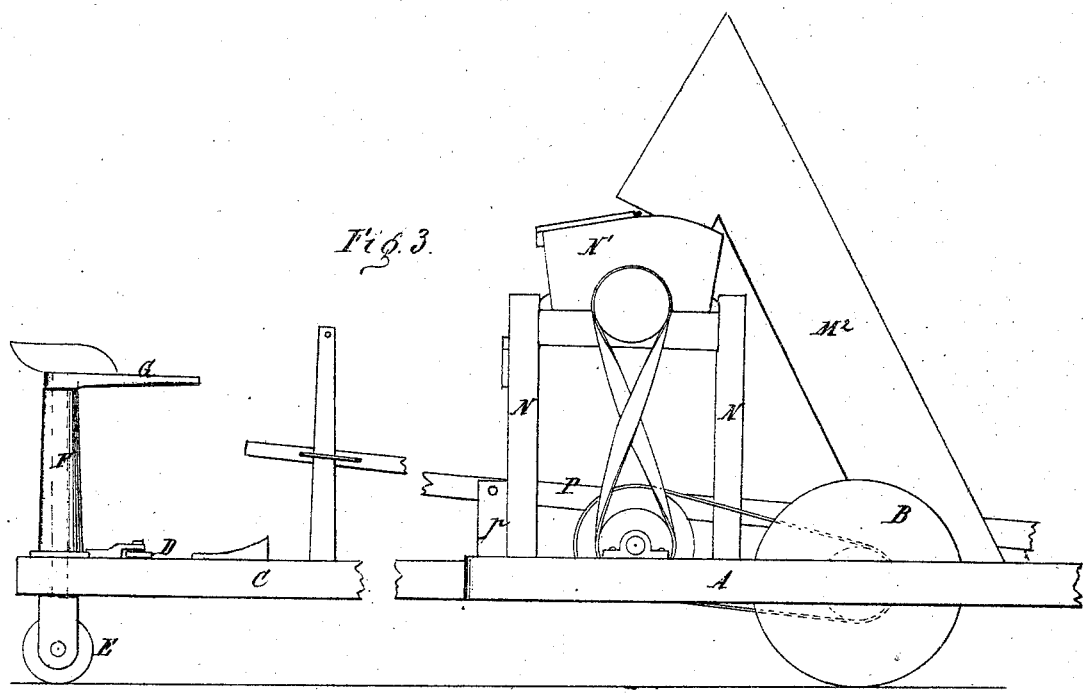
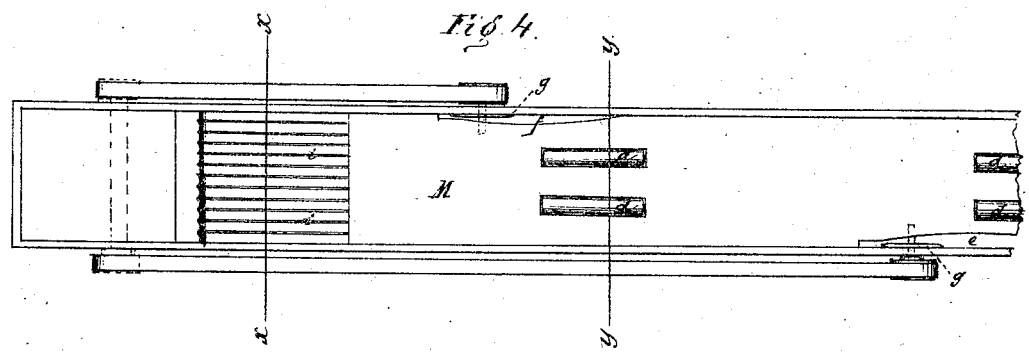
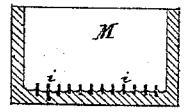
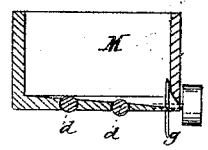
Witnesses:  
Inventor:  
Leonard Devore 118,217

UNITED STATES PATENT OFFICE.

LEONARD DEVORE, OF VICTOR, IOWA, ASSIGNOR OF ONE-THIRD OF HIS RIGHT TO D. J. HUSSEY, AND ONE-THIRD TO B. F. BOOTH, OF SAME PLACE.

IMPROVEMENT IN COMBINED CORN-HARVESTERS AND HUSKERS.

Specification forming part of Letters Patent No. 118,217, dated August 22, 1871.

*To all whom it may concern:*

Be it known that I, LEONARD DEVORE, of Victor, in the county of Iowa and State of Iowa, have invented a new and Improved Combined Corn-Harvester and Husker; and I do hereby declare the following to be a full, clear, and exact description of the same, reference being had to the accompanying drawing making a part of this specification, in which—

Figure 1:
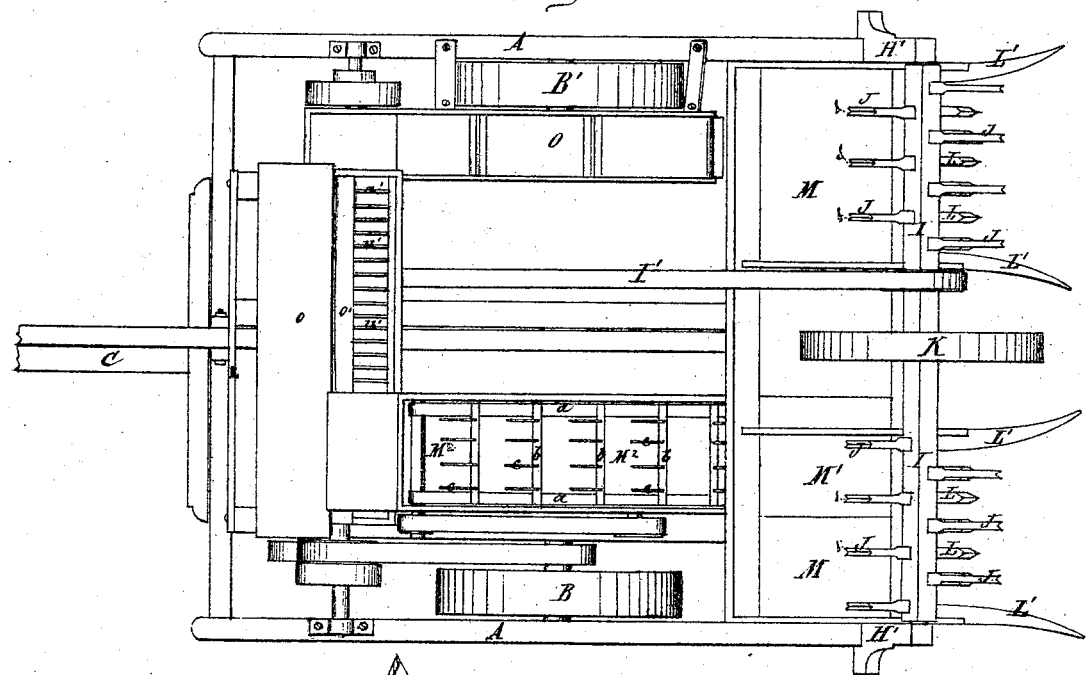
Figure 2:
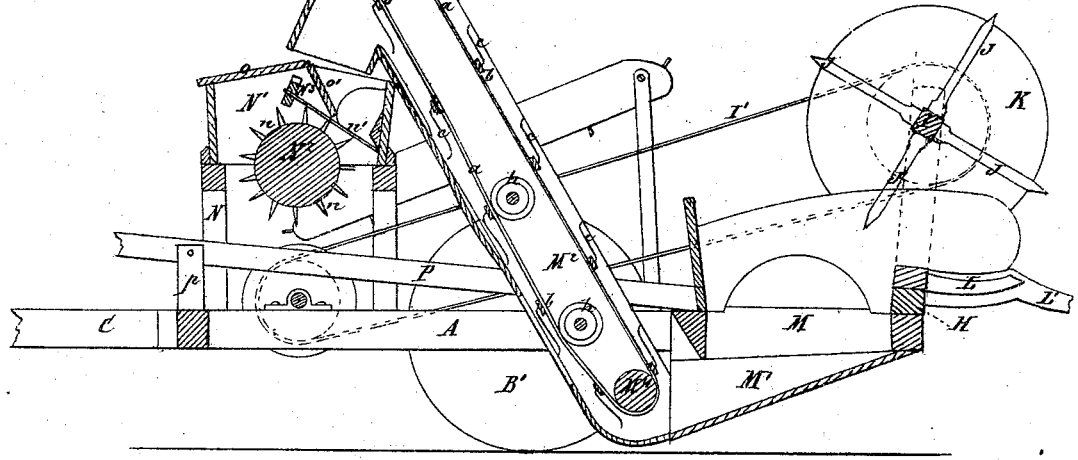

Figure 1 is a top view. Fig. 2 is a longitudinal vertical section. Fig. 3 is a side elevation. Fig. 4 is a top view of the elevator-case; and Figs. 5 and 6 are transverse sections in the lines $x\,x$ and $y\,y$, respectively, Fig. 4.

This invention relates to a machine that, when drawn through a field of standing corn, gathers the ears, drops them into an elevator, cuts off the knobs, slits the shucks while on the ears into transverse ribbons, doing such cutting and slitting at the same time that the ears are being elevated, drops the ears from the elevator into the shucker, strips off the husks, throwing them out of the machine, and finally conveys the ears off to one side of the apparatus, where it lets them fall into any receptacle that may be provided.

Referring to the drawing, A is the main frame, supported on two wheels, B B', placed at the middle of the frame. C is a tongue, extending from the rear end of the frame A, instead of from the front end, where it is usually attached, said tongue bearing near its rear end a whiffletree, D, and being supported at its hind extremity on a caster-wheel, E, whose pintle is placed in a vertical tube, F, attached to the tongue, which pintle has a rudder, G, at its top. The horses walk in rear of the frame A, with their heads toward the latter. To the front end of the frame A a bar, H, Fig. 2, is attached, at each end of which is a standard, H'. A shaft, I, is mounted in the standard H', which shaft bears four rows of fingers, J, placed at a quadrant's distance apart, and divided into two separate sets by a fly-wheel, K, placed on the middle of the shaft. Beneath each set of fingers J is a comb, L, secured to the bar H, the teeth of the comb extending forward. At the ends of each comb horns L' extend outward, considerably beyond the teeth L, and are slanted downward. The shaft I is rotated by a band, I', which is worked ultimately by the wheel B'. The horns L' gather the stalks, lifting up such of them as may be bent downward. The combs L receive the stalks in their interstices, and the fingers J break the ears off the stalks. The fingers J are grooved in their front sides at their points, as shown at $s$, Fig. 1, the grooves being of the average length of an ear of corn, and their office being to receive the ears and prevent them from breaking. At their extremities the fingers are notched so as to allow any stalk that may be caught between a finger and one of the teeth L to be passed by the fingers without breaking. The fingers J are placed alternately with respect to each other in the shaft I, so that those fingers that are at right angles with each other may pass over different portions of the comb. From the combs L the ears fall into a box, M, whose bottom is inclined from each end toward a chute, M¹, standing crosswise of the box M and below its bottom, which chute conducts the ears to the foot of the elevator-case M², which is hinged near its lower end to the frame A and rests at its upper end upon the frame N. The case M² contains two transverse shafts, M³ M⁴, one at the top and the other at the bottom, which shafts are rotated by means of intermediate connection with the wheel B. Belts $a\,a$ connect the shafts M³ M⁴, which belts bear transverse bars $b$ that are armed with spring-hook $c$, which, as they ascend, carry up with them the ears received from the chute M¹, the ears being compressed between the hooks and the sheet-iron bottom of the case M². As shown in Fig. 4, the bottom of said case is provided at two different points with longitudinal rollers $d$. Said bottom slants or inclines to the left of the lower set of rollers, and to the right of the upper set, so that the corn shall tend to concentrate on the respective sides of the case, over the rollers. At the outer edge of the lower slant is a slot, $e$, and at the outer edge of the upper slant a slot, $f$, in the bottom of the case, in which slots sit sickle-edged cutters $g$, whose function is to cut off the knobs of the ears as they are moved toward the cutters by the rollers $d$ and pressed upon them by the hooks $c$, and also by rollers $h$ placed in the case M² for the purpose. Near its upper end the bottom of the case is provided with longitudinal sickle-edged blades $i$, placed at intervals of an inch, over which the ears are drawn, the latter lying crosswise of the case M². The blades $i$ cut the husks transversely, the ears being rolled as they are drawn over the blades. From the case M² the ears, with the husks thus cut, fall into a bottomless box, $N^1$, mounted in an inclined position on the frame N. Lengthwise of the box $N^1$ is mounted an inclined roller, $N^2$, armed with a sufficient number of radial teeth, $n$. A rail, $N^3$, runs lengthwise of the box $N^1$, above the roller $N^2$, between which rail and the adjacent side of the box $N^1$ is secured a row of slanting rods, $n'$, placed crosswise of the box $N^1$ and above the roller $N^2$, yet so that the teeth $n$ extend between the rods $n'$. The ears fall upon the flap $o'$, and thence upon the rods $n'$. The flap $o'$ prevents the ears from being carried too far upward in the box. By the teeth $n$ the ribbons of the husks are knocked off. The husks fall between the rods $n'$ and escape from the machine. The ears pass downward, above the rods $n'$, to the lower end of the box $N^1$ through a hole, in which they escape and fall upon a carrier-belt, O, placed at the side of the apparatus, by means of which any desired disposition is made of them. The box $N^1$ is furnished with covers $o$ for the purpose of preventing the husks from flying out at its top. By means of a lever, P, pivoted between standards $p$, Figs. 2 and 3, and secured at its forward end to the front part of the frame A, the latter may be raised or lowered to suit the height of the ears upon the corn.

Having thus described my invention, what I claim as new, and desire to secure by Letters Patent, is—

1. The combination of the combs L, horns $L'$, and rotating fingers J provided with grooves $s$, as specified.

2. The combination of the foregoing with the box M, chute $M^1$, and elevator-case $M^2$, as described.

3. The case $M^2$, provided with the rollers $d$ and slots $e\,f$, constructed with a slanting bottom opposite said slots, and combined with the cutters $g$, as set forth.

4. The case $M^2$, provided with the blades $i$, as explained.

5. The combination of the box $N^1$, rods $n'$, roller $N^2$, rail $N^3$, and cover $o$ and flap $o'$, as specified.

LEONARD DEVORE.

Witnesses:
SOLON C. KEMON,
CHAS. A. PETTIT.